(12) United States Patent
Boegli

(10) Patent No.: US 7,147,453 B2
(45) Date of Patent: Dec. 12, 2006

(54) DEVICE FOR TREATING FLAT MATERIAL

(75) Inventor: Charles Boegli, Marin-Epagnier (CH)

(73) Assignee: Boegli-Gravures SA, Marin-Epagnier (CH)

(*) Notice: Subject to any disclaimer, the term of this patent is extended or adjusted under 35 U.S.C. 154(b) by 166 days.

(21) Appl. No.: 10/471,761

(22) PCT Filed: Mar. 13, 2002

(86) PCT No.: PCT/CH02/00149

§ 371 (c)(1),
(2), (4) Date: Jan. 15, 2004

(87) PCT Pub. No.: WO02/076716

PCT Pub. Date: Oct. 3, 2002

(65) Prior Publication Data

US 2004/0109911 A1    Jun. 10, 2004

(30) Foreign Application Priority Data

Mar. 26, 2001   (CH) ................. 2001 0544/01

(51) Int. Cl.
*B31F 1/07* (2006.01)
*B29C 59/04* (2006.01)

(52) U.S. Cl. ............... 425/363; 72/196; 101/6; 101/23; 425/367; 425/369

(58) Field of Classification Search ........... 425/335, 425/336, 363, 367, 369; 101/6, 23; 72/196
See application file for complete search history.

(56) References Cited

U.S. PATENT DOCUMENTS

| | | | |
|---|---|---|---|
| 1,735,340 A | 11/1929 | Smith | |
| 2,290,608 A | 7/1942 | Evans | |
| 2,442,567 A * | 6/1948 | Jesseph | 101/24 |
| 2,681,611 A * | 6/1954 | Jacobs | 101/23 |
| 2,856,323 A * | 10/1958 | Gordon | 264/284 |
| 3,323,983 A * | 6/1967 | Palmer et al. | 425/363 |
| 3,335,592 A * | 8/1967 | Woodling | 72/196 |
| 3,500,744 A * | 3/1970 | Lewis | 101/23 |
| 3,596,816 A * | 8/1971 | Brown | 264/DIG. 47 |
| 3,608,047 A * | 9/1971 | Wiggins | 264/286 |
| 3,611,919 A * | 10/1971 | Thomas | 101/23 |
| 3,841,963 A * | 10/1974 | Schlunke | 162/362 |
| 4,153,664 A * | 5/1979 | Sabee | 264/280 |
| 4,272,473 A * | 6/1981 | Riemersma et al. | 264/284 |

(Continued)

FOREIGN PATENT DOCUMENTS

EP    1 074 381 A    2/2001

(Continued)

*Primary Examiner*—James P. Mackey
(74) *Attorney, Agent, or Firm*—Foley & Lardner LLP

(57) ABSTRACT

The invention relates to a device for embossing and/or glazing films. The device for embossing includes a first and second embossing roll, through which flat material can be fed under pressure, in order to create a pattern. An additional embossing roll is connected downstream of the second embossing roll, this additional embossing roll interacting with the first or preceding embossing roll. The patterned flat material may be fed between these embossing rolls, in order to be embossed again with essentially the same pattern. In a simplified embodiment, only a total of two rolls are used. In order to achieve as precise an embossing as possible, with special effects, the first driven embossing roll is provided with teeth, while at least one other embossing roll comprises rings or longitudinal ribs, or is smooth.

17 Claims, 6 Drawing Sheets

U.S. PATENT DOCUMENTS

| | | | | |
|---|---|---|---|---|
| 4,280,978 A | * | 7/1981 | Dannheim et al. | 264/156 |
| 4,499,040 A | * | 2/1985 | Maemoto et al. | 425/369 |
| 4,609,514 A | * | 9/1986 | Kyle et al. | 264/153 |
| 4,614,632 A | * | 9/1986 | Kezuka et al. | 425/363 |
| 4,732,082 A | * | 3/1988 | Ireton | 101/23 |
| 5,007,271 A | * | 4/1991 | Boegli | 72/196 |
| 5,061,232 A | * | 10/1991 | Bloch et al. | 493/395 |
| 5,158,521 A | * | 10/1992 | Singh | 101/6 |
| 5,269,983 A | * | 12/1993 | Schulz | 264/284 |
| 5,598,774 A | * | 2/1997 | Boegli | 100/170 |
| 5,628,097 A | * | 5/1997 | Benson et al. | 264/145 |
| 5,670,188 A | * | 9/1997 | May et al. | 425/363 |
| 5,779,965 A | * | 7/1998 | Beuther et al. | 264/284 |
| 5,913,765 A | * | 6/1999 | Burgess et al. | 493/403 |
| 6,039,555 A | * | 3/2000 | Tsuji et al. | 425/363 |
| 6,109,326 A | * | 8/2000 | Leakey et al. | 156/553 |
| 6,173,496 B1 | * | 1/2001 | Makoui et al. | 492/30 |
| 6,176,819 B1 | * | 1/2001 | Boegli et al. | 493/355 |
| 6,264,872 B1 | * | 7/2001 | Majors et al. | 264/284 |
| 6,665,998 B1 | * | 12/2003 | Boegli | 101/22 |
| 6,715,411 B1 | * | 4/2004 | Boegli | 101/6 |
| 6,739,024 B1 | * | 5/2004 | Wagner | 264/156 |

FOREIGN PATENT DOCUMENTS

| | | | |
|---|---|---|---|
| WO | WO 99/54547 A | | 10/1999 |
| WO | WO 00/34562 | * | 6/2000 |
| WO | WO 00/69622 A | | 11/2000 |

* cited by examiner

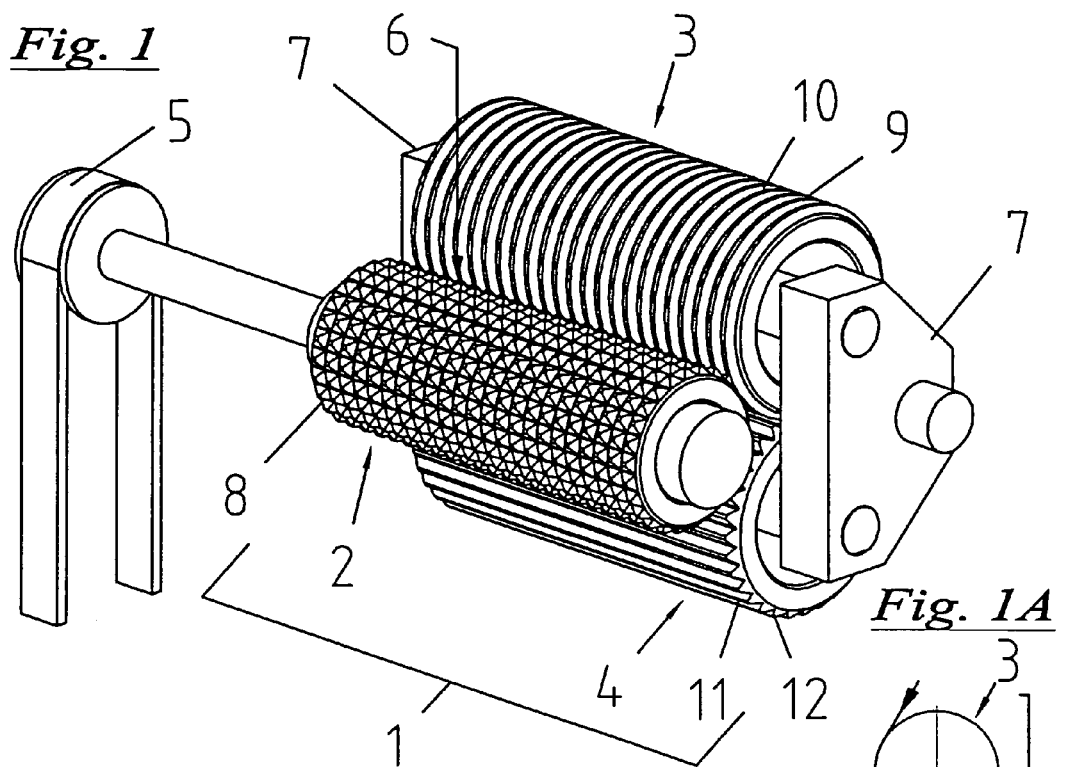
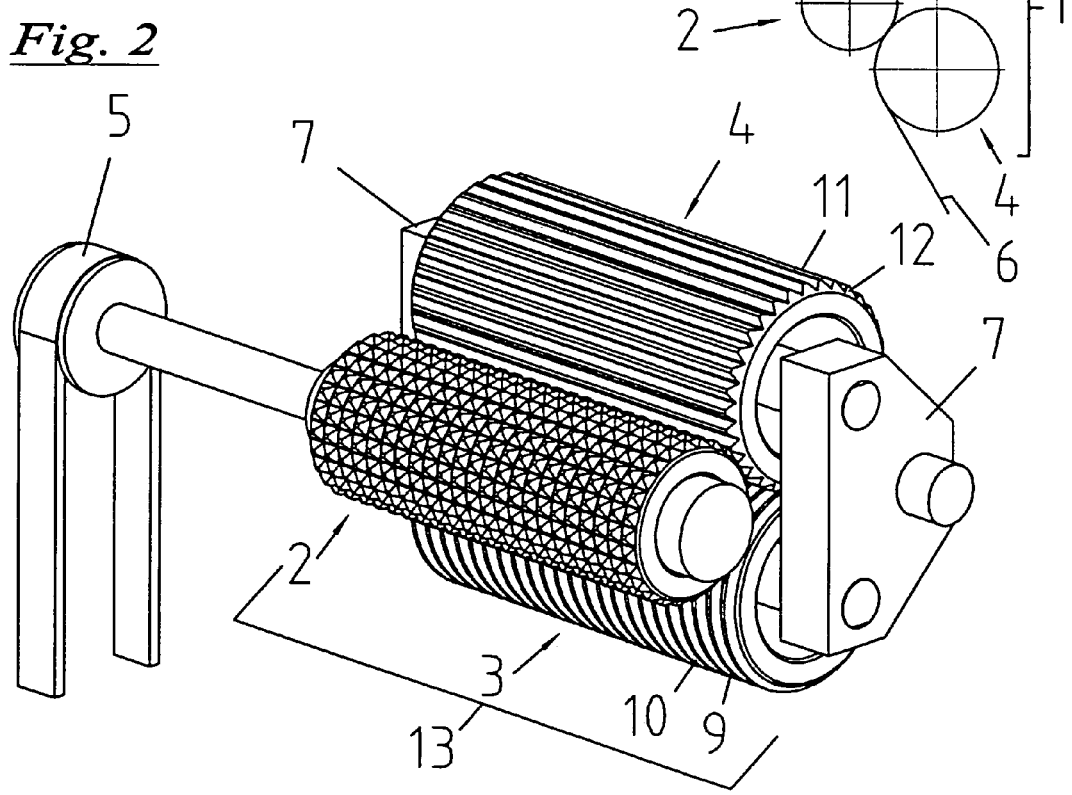

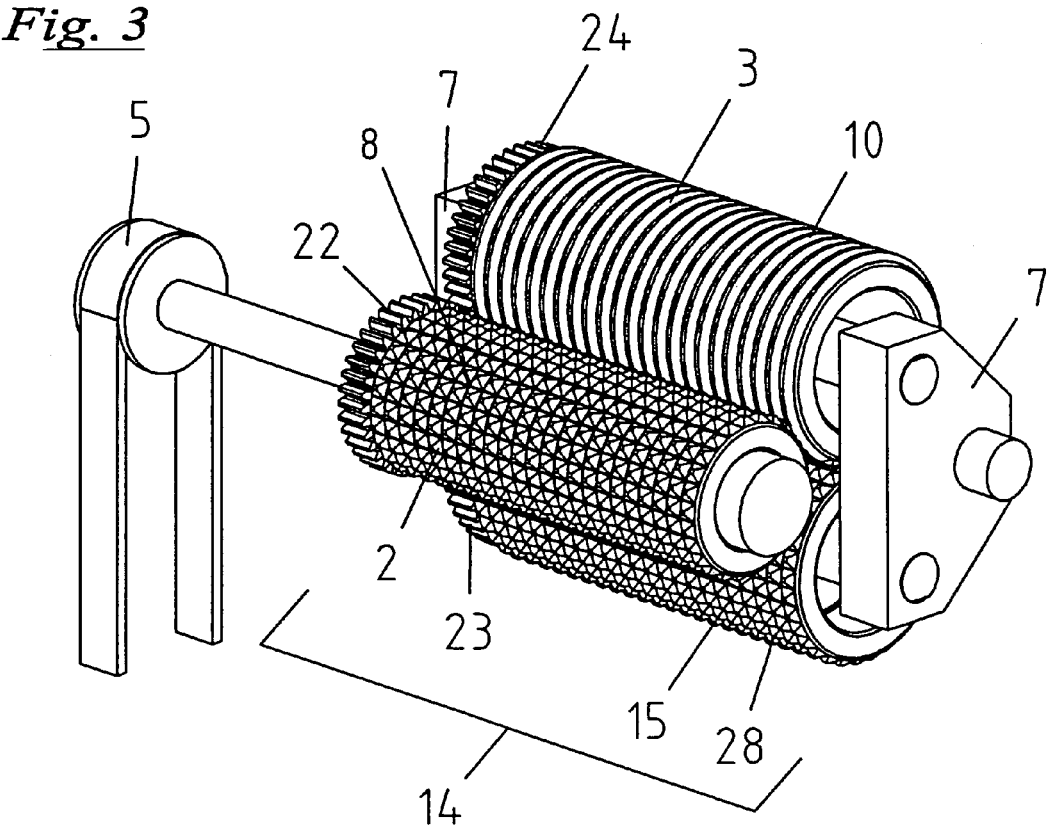
*Fig. 3*
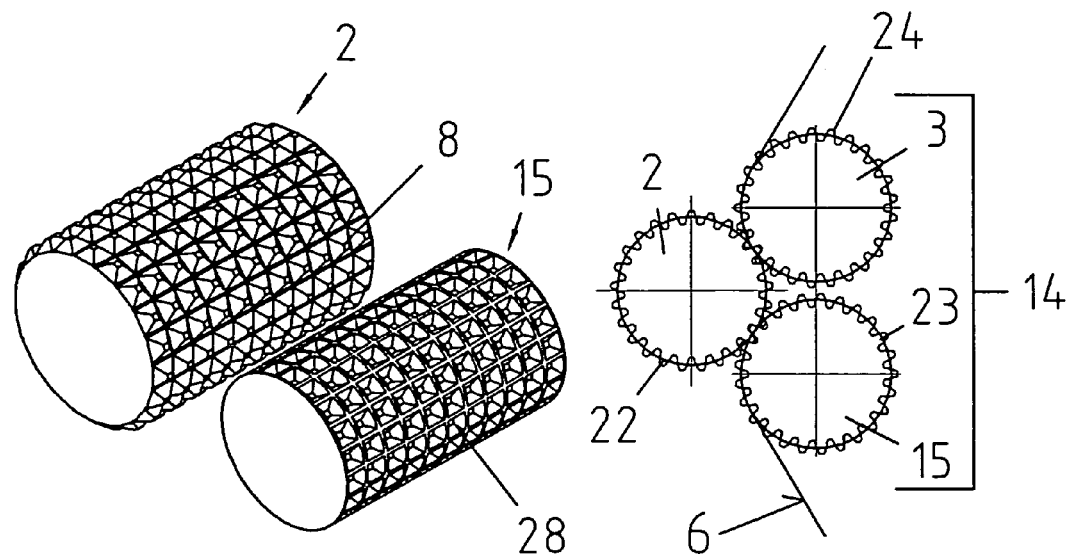
*Fig. 3B*  *Fig. 3A*

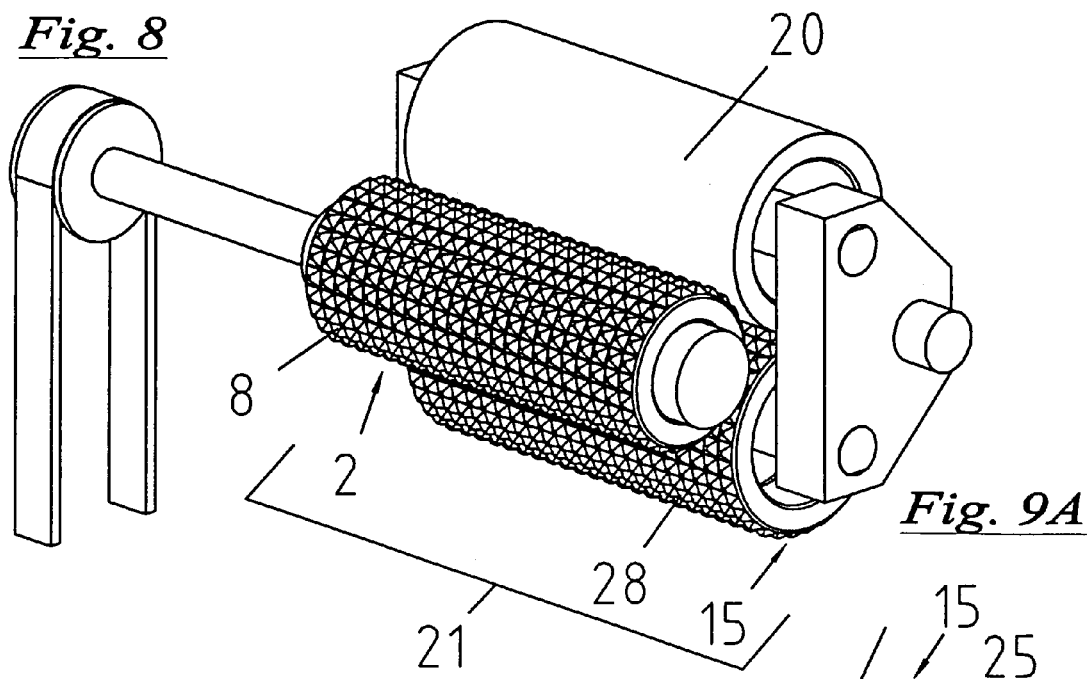
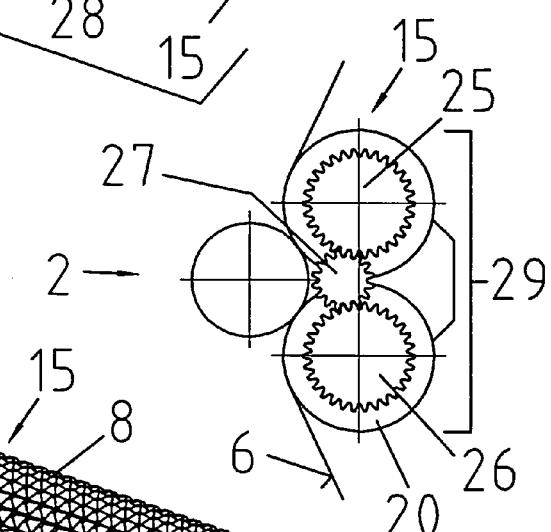
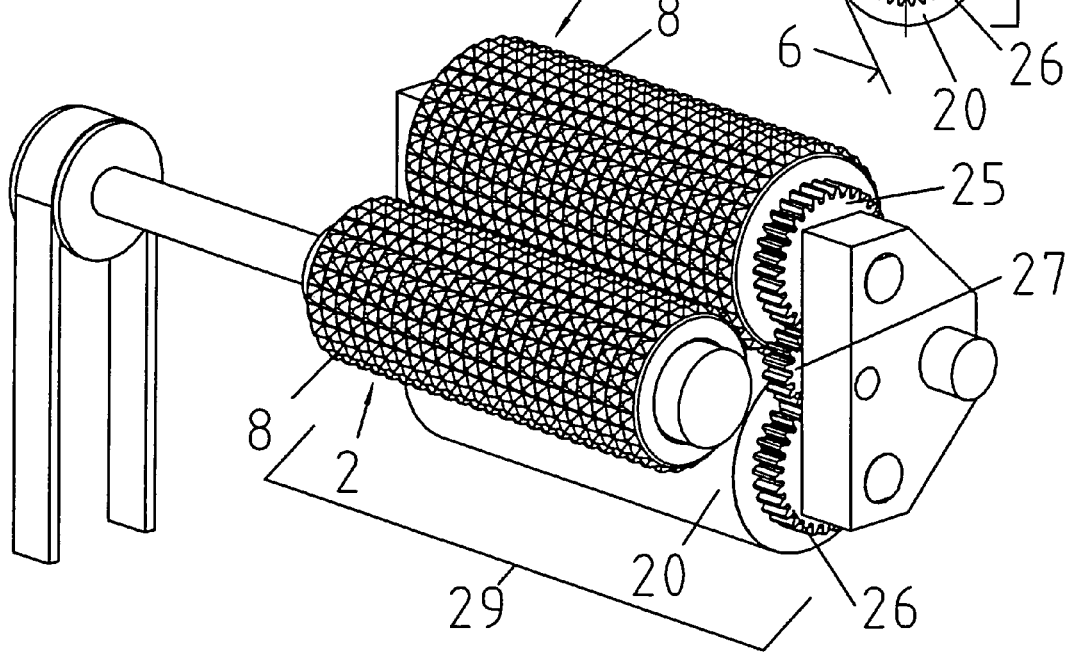

DEVICE FOR TREATING FLAT MATERIAL

BACKGROUND OF THE INVENTION (1) Field of the Invention

The present invention refers to a device for the treatment of flat materials, more particularly for embossing and/or satinizing foils, the device comprising at least three embossing rolls.

(2) Related Art

A device of this kind is e.g. known from WO-A-00/69622, this reference being exclusively referring to rolls having each the same structure, more particularly truncated pyramidal teeth where each tooth of a roll engages between four teeth of another roll while the additional roll has the function of providing an increased embossing quality and a reduced wear of the rolls especially in the case of flat materials having a large paper and small metallized proportion.

The embossing station for embossing fiber webs as for handkerchiefs or toilet paper according to EP-A-1 074 381 comprises a smooth mating roll and two embossing rolls disposed above the latter in a V-shaped arrangement. However, such an arrangement is unsuitable for satinizing or for embossing special signs on materials such as cigarette paper as the embossing rolls, which are not described in detail and are illustrated with a relatively coarse profile, are not intended for this purpose.

EP-A-498 623 discloses the application of pairs of steel and rubber rolls with knobs on the steel rolls that fit into corresponding recesses in the rubber roll. The application of two pairs of identical or similar rolls is also disclosed. Such pairs of rolls with recesses in a rubber roll are unsuitable for a precise fine embossing and satinizing as it is required e.g. for the treatment of packaging foils where the flat material is a fibrous material such as paper which is bulked after the treatment.

U.S. Pat. No. 4,280,978 discloses an embossing and perforating device including an embossing and two mating rolls, the mating rolls comprising recesses that are adapted to the spikes of the embossing rolls. This device is also unsuitable for a precise fine embossing and satinizing.

U.S. Pat. No. 2,290,608 discloses a method and device for wrinkling a metal foil, thereby producing irregular patterns that are suitable for reflectors. The metal foil passes between two rolls provided with pegs, longitudinal grooves, wave-shaped grooves, or honeycomb structures and is rotated by 90° or 45° after each pass. A device of this kind is neither appropriate for embossing nor for satinizing, and it is also inappropriate for embossing security features on suitable materials.

Further known are U.S. Pat. No. 5,007,271 or U.S. Pat. No. 5,598,774 to the applicant of the present invention, which disclose embossing devices with two embossing rolls for flat materials. In particular, the flat materials in question are bands or strips one face of which is coated with metal, generally with aluminum, and whose support consists of paper or another fibrous material, or foils, e.g. of synthetic materials, of metal, or of compound materials.

Inter alia, the latter embossing devices are used in the packaging industry for the purpose of satinizing packaging materials while seals, emblems and the like may be stamped at the same time. In this context, satinizing means providing the surface with a fine pattern in the millimeter and submillimeter range. Strip or sheet packaging materials of this kind, also called innerliners, are e.g. used for packaging tobacco products, cigarettes, foods, chocolates, chewing gums and the like.

According to the cited reference U.S. Pat. No. 5,598,774, the driven roll is supported stationarily while at least one of the two mating rolls is free-wheeling and journalled such that the axes of the embossing rolls are capable of an excursion both in the longitudinal and/or in the contact pressure direction and/or in the travelling direction of the material. This allows an adjustment of the rolls that provides a precise mutual engagement of the teeth and thus a perfect processing of the material without the risk of wrinkling it.

The last mentioned devices have been successful and still are as long as the satin-finished foils, more particularly packaging foils, are mainly composed of aluminum or mainly of easily foldable paper. In the manufacture of cigarette packages, for example, these packaging materials serve the purpose of wrapping up a counted number of cigarettes in the production process in order to be subsequently inserted in a box.

Whereas the first mentioned device according to WO-A-00/69622 provided the expected advantages in the embossing of flat materials that are difficult to emboss otherwise, it has appeared that the rolls do not have suitable surface structures for embossing certain special signs on the flat material that produce optical effects depending on the viewing position and/or the light source.

SUMMARY OF THE INVENTION

On the background of this prior art, an embodiment of the present invention provides a device for producing embossed patterns that allows signs with optical effects that depend on the viewing position and/or the light source to be embossed on flat materials with higher precision and in a wider variety in order to produce security features that are difficult to copy.

Another embodiment of the present invention provides a device in which a large range of flat materials can still be embossed with signs providing optical effects that depend on the viewing position and/or the light source with higher precision and in a wider variety in order to produce security features that are difficult to copy.

Further advantages and characteristic features are defined in the dependent claims.

BRIEF DESCRIPTION OF THE DRAWINGS

FIG. 1 shows a schematic perspective view of a first embodiment of the invention including three rolls;

FIG. 1A shows a schematic sectional view of the device of FIG. 1 with the embossed medium;

FIG. 2 shows a variant of the example of FIG. 1;

FIG. 3 shows a second exemplifying embodiment of the device of the invention;

FIG. 3A shows a synchronizing gear according to FIG. 3;

FIG. 3B schematically shows the pinup-pindown constellation of the teeth;

FIG. 8 shows a variant of the example of FIG. 7;

FIG. 9 shows another variant of FIG. 7;

FIG. 9A shows a synchronizing gear of the arrangement of FIG. 9 in a sectional view;

DESCRIPTION OF SOME OF THE EMBODIMENTS

Figure 4:
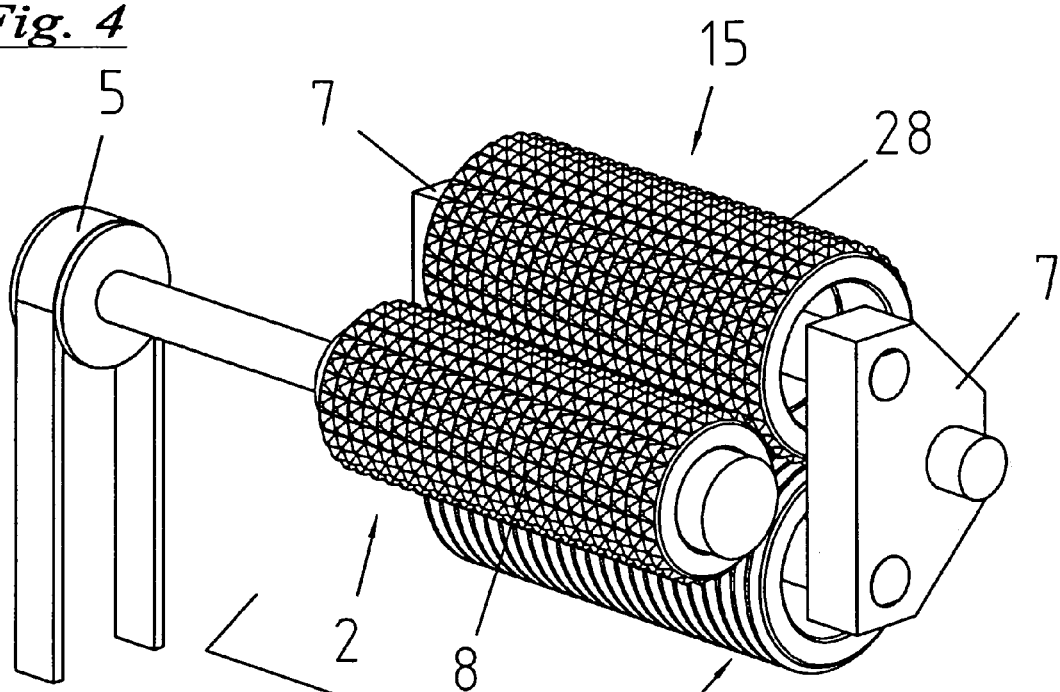
FIG. 4 shows a variant of the example of FIG. 3.

FIG. 1 shows a first exemplifying embodiment of a device 1 including three embossing rolls where a first embossing roll 2 cooperates with a second embossing roll 3 and a following embossing roll 4, the first roll 2 being driven by a driving system 5 whereas the two other rolls 3 and 4, i.e. the mating rolls, are neither driven nor synchronized with the driven roll by synchronizing elements such as e.g. gearwheels, but driven by the medium 6, see FIG. 1A.

As symbolically indicated in FIG. 1A, the embossed medium 6, e.g. paper metallized with a thin layer of 0.006 mm, runs in the vertical direction, i.e. from the top to the bottom of the figures.

In contrast to the device disclosed in the mentioned reference WO-A-0 069 622 to the applicant of the present invention, the three embossing rolls do not have the same structure. In the exemplifying embodiment of FIG. 1, the first, driven embossing roll 2 is the same as in the device of the prior art and comprises a number of teeth 8 designed in the form of truncated pyramids, the sides of the pyramids extending in parallel resp. perpendicularly to the longitudinal axis of the embossing roll, as illustrated in FIG. 1. In the present example, the second embossing roll 3 is provided with grooves 9 extending on the entire circumference and arranged in parallel to each other such that the teeth 8 of the driven embossing roll 2 engage in the grooves. The rings 10 formed between grooves 9 are also outwardly tapered and flattened such that they penetrate between the truncated pyramidal teeth 8.

In analogy, the third embossing roll 4 comprises longitudinal grooves 11 forming longitudinal ribs 12 between them, the latter again being outwardly tapered and flattened like rings 10 in such a manner that longitudinal grooves 11 and the longitudinal ribs cooperate with the teeth 8 of driven embossing roll 2.

The production of inscriptions, devices, and the like, hereinafter called patterns, is realized by removing or shortening teeth on the embossing roll 2 that comprises teeth 8. The rings resp. longitudinal ribs may influence the appearance of the embossed patterns produced by means of the embossing roll provided with the teeth. Through variations of the teeth 8 or of rings 10 or longitudinal ribs 12, i.e. by modifications of the height, of the flanks or the edges of the teeth, the rings, or the longitudinal ribs, or through patterns provided on the upper surface thereof, the embossing roll combinations of the invention allow to produce embossed patterns or signs generating a particular optical effect such that the embossed pattern changes as it is viewed from different angles and/or under different lighting conditions or only appears under a certain angle and/or under certain lighting conditions. To this effect, the height of the teeth, of the rings or of the longitudinal ribs may be varied, or the design of individual teeth, of entire rings or of parts thereof, and of entire ribs or of parts thereof may differ from that of the remaining elements.

In FIG. 1 or 2, it is symbolically indicated that the second and the third embossing roll 3 and 4 are in engagement with driven embossing roll 2, but this is not necessarily always the case. It is also conceivable that the second resp. the third embossing roll is in engagement or capable of engaging with the first resp. the preceding embossing roll only. Furthermore, it may be advantageous for certain applications to provide more than a total of three embossing rolls having different surface structures. Also, both the diameter and the length of the individual rolls may vary. Soft rolls may be used in addition to the embossing rolls.

In FIG. 2 appears a second device 13 comprising the same driven roll 2 and the embossing rolls 3 and 4 with rings resp. longitudinal ribs, the sequence of embossing rolls 3 and 4 being reversed as compared to the sequence according to FIG. 1, and the embossing roll that comprises the longitudinal ribs engaging before the embossing roll comprising the rings when seen in the travelling direction of the material 6.

In the exemplifying embodiment of FIG. 3, device 14 again comprises the same driven roll 2, followed as in FIG. 1 by the embossing roll 3 provided with rings 10. The following embossing roll 15 is either provided with an identical toothing as embossing roll 2, i.e. with the same teeth 8 whose bases are arranged in parallel and perpendicularly to the longitudinal axis or, as illustrated, with a toothing 28 that is complementary thereto.

In analogy to the already cited reference WO-A-0 069 622, for the production of special embossed patterns, it is advantageous to provide a positive synchronization of embossing rolls 2 and 15 provided with teeth 8 and recesses 28, respectively, as it is symbolically indicated in FIG. 3A by the gearwheels 22 and 23, the gearwheels generally representing synchronizing elements including other synchronizing means that are known per se, such as electronic components and the like. Also, a positive synchronization is particularly recommended if the material is subject to strong warping in the embossing procedure.

Generally, for the embossing type intended here, pairs of rolls whose teeth correspond to the so-called pinup-pindown constellation will be chosen, i.e. where a tooth 8 of one roll fits into a recess 28 of the other roll, see FIG. 3B.

However, for special situations, it is also conceivable to choose the so-called pinup-pinup situation where each tooth of one roll interpenetrates between four respective teeth of the other roll and all teeth are designed and arranged alike. In this case, although a positive synchronization of the two rolls is also advantageous for the suggested special embossing, an operation where driven roll 2 is journalled stationarily and the other toothed roll is free-wheeling and journalled as described in the introduction with regard to U.S. Pat. No. 5,598,774 is possible too. It follows that the axles of the embossing rolls are capable of an excursion both in the longitudinal direction and/or in the contact pressure direction and/or in the passing direction of the material, thereby allowing an adjustment of the rolls that provides a precise mutual engagement of the teeth and thus a perfect processing of the material without the risk of wrinkling it. This is also described in EP-A-0 925 911 to the applicant of the present invention.

Figure 5:
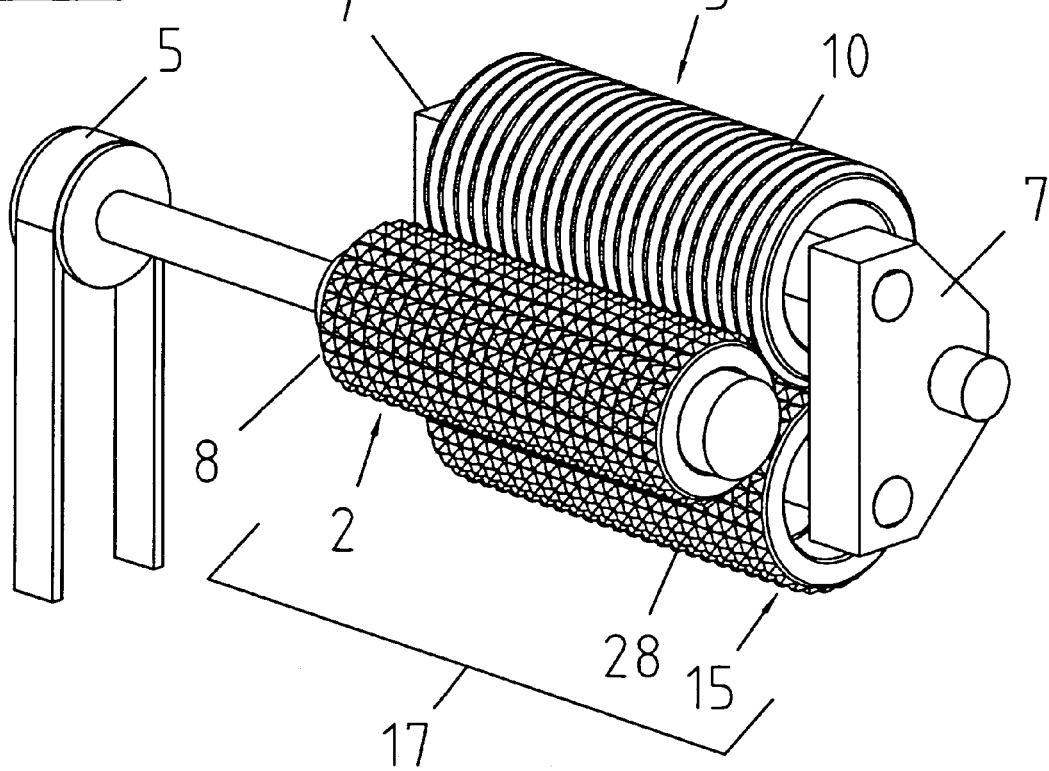
FIG. 5 shows a third exemplifying embodiment of the device of the invention.

As a variant of FIG. 3, the exemplifying embodiment of FIG. 4 is illustrated where the sequence of rolls 3 and 15 is reversed. FIG. 5 shows another variant of FIGS. 3 and 4, device 17 in FIG. 5 comprising the same driven roll 2 and the same embossing roll 15 as in FIGS. 3 and 4, as well as embossing roll 3 with rings 10, whereas the embossing rolls are not positively synchronized in contrast to FIG. 3.

Figure 6:
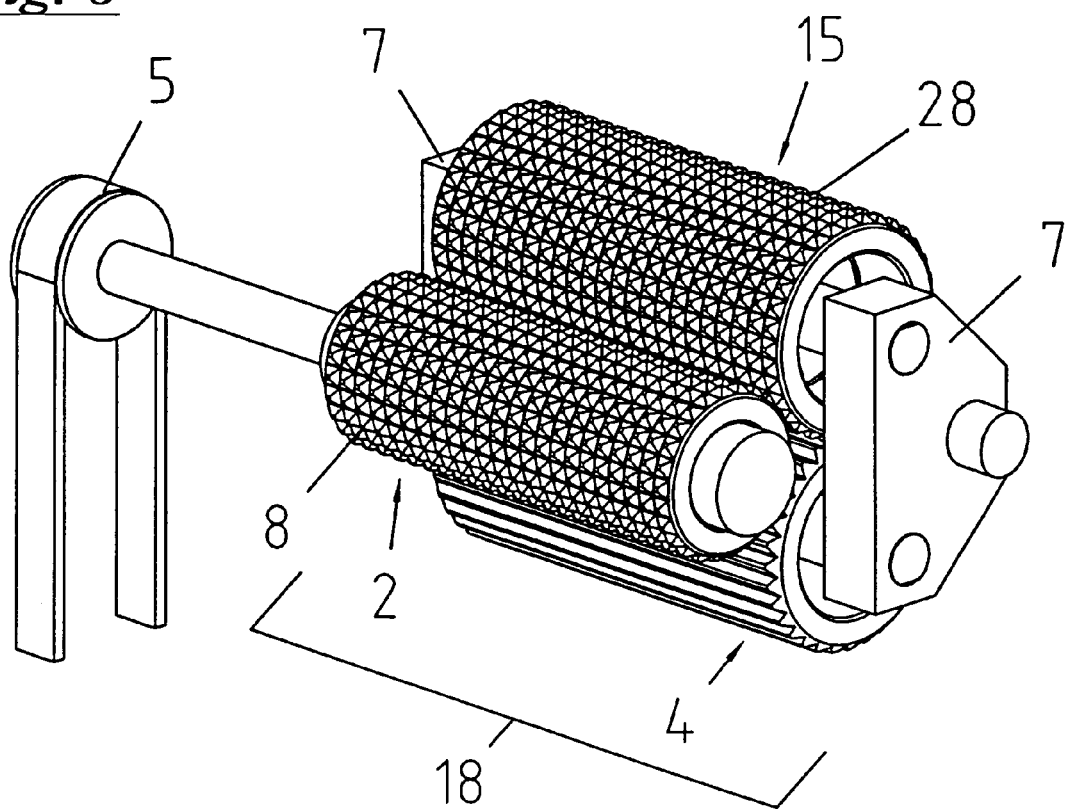
FIG. 6 shows a variant of the example of FIG. 4.

In FIG. 6, a further exemplifying embodiment is described where device 18 comprises the two embossing rolls 2 and 15 as well as embossing roll 4 with longitudinal ribs 12.

Figure 7:
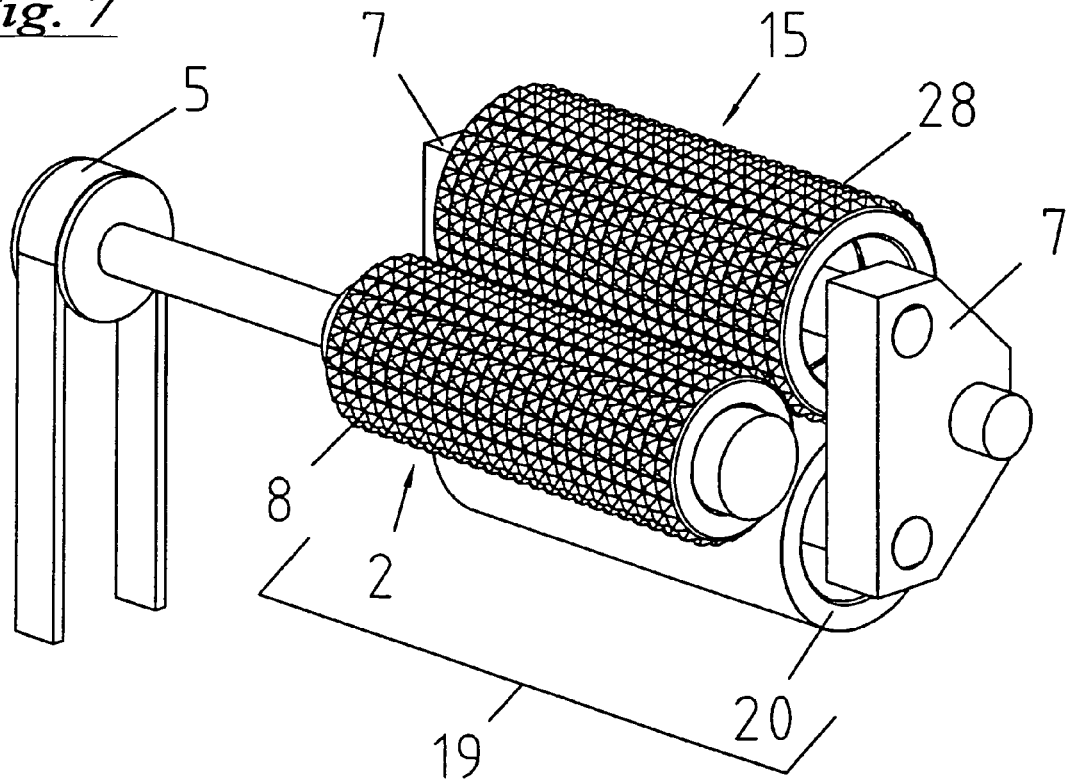
FIG. 7 shows a fourth exemplifying embodiment of the device of the invention.

FIGS. 7 and 8 illustrate another exemplifying embodiment and a variant thereof, driven roll 2 and embossing roll 15 of the preceding examples constituting the first and the second rolls of this device 19, respectively, while the third roll, in contrast to the preceding examples, is a rubber roll 20 having a comparatively smooth surface. In device 21 according to FIG. 8, the sequence of rolls 15 and 20 is reversed.

FIGS. 9 and 9A illustrate a variant of the embodiment of FIG. 7 where the two embossing rolls 2 and 15 each comprise the same toothing 8, i.e. are arranged in a pinup-pinup configuration, and the two non-driven rolls 15 and 20 are positively synchronized by a gear comprising gearwheels 25, 26, and 27.

Based on these examples, variations are possible: Thus, rubber roll 20 may be used instead of ring roll 3 or longitudinally ribbed roll 4.

Furthermore, the bearings, resp. the two yokes 7 accommodating the two bearings, are schematically illustrated in the figures, thereby also indicating that the roll axles may be journalled individually, in groups or in common.

Here also, the embossing rolls need not have equal diameters and equal lengths, but in contrast to the first example, unless they are equal, the diameters of the rolls must form an integral ratio if the synchronization is provided by gearwheels, whereas their lengths may differ individually.

In EP-A-1 048 369 to the applicant of the present invention, which is explicitly included herein by reference, an embossing device is indicated where at least one of the embossing rolls is contained in an exchangeable unit such that it is insertable in a predetermined position in a bearing mount.

In the present device with at least three embossing rolls, the arrangement of the rolls in exchangeable units, individually or in groups, is particularly advantageous as the rationalization effect and the ecological advantages are particularly important in this case.

The preceding disclosure shows that the device of the invention offers many advantages:

a) The application of rolls provided with different structures, of which at least one roll comprises the teeth of the prior art and at least one additional roll comprises a different structure, e.g. longitudinal ribs or rings, or is a smooth rubber roll, allows such a fine embossing that its structures are variable according to the viewing angle and/or the lighting conditions. This allows to produce largely forgery-proof security features.

b) Due to the application of more than two rolls, the paper fibers are broken in the best possible manner and the memory effect of the paper is largely neutralized. This is accomplished by a precise positioning of the successive embossing rolls in operation, thereby allowing to re-emboss even very fine existing embossing patterns without optical deterioration.

c) The improved folding behavior of the wrapping packaging foils eliminates problems in inserting pre-folded packaging units into the box.

d) An advantageous construction allows shorter changeovers between embossing patterns and between embossing rolls and thus shorter standstill times of the packaging machine.

e) The device allows to design an embossing machine whose embossing roll construction requires no flexural compensation of the rolls.

Figure 10:
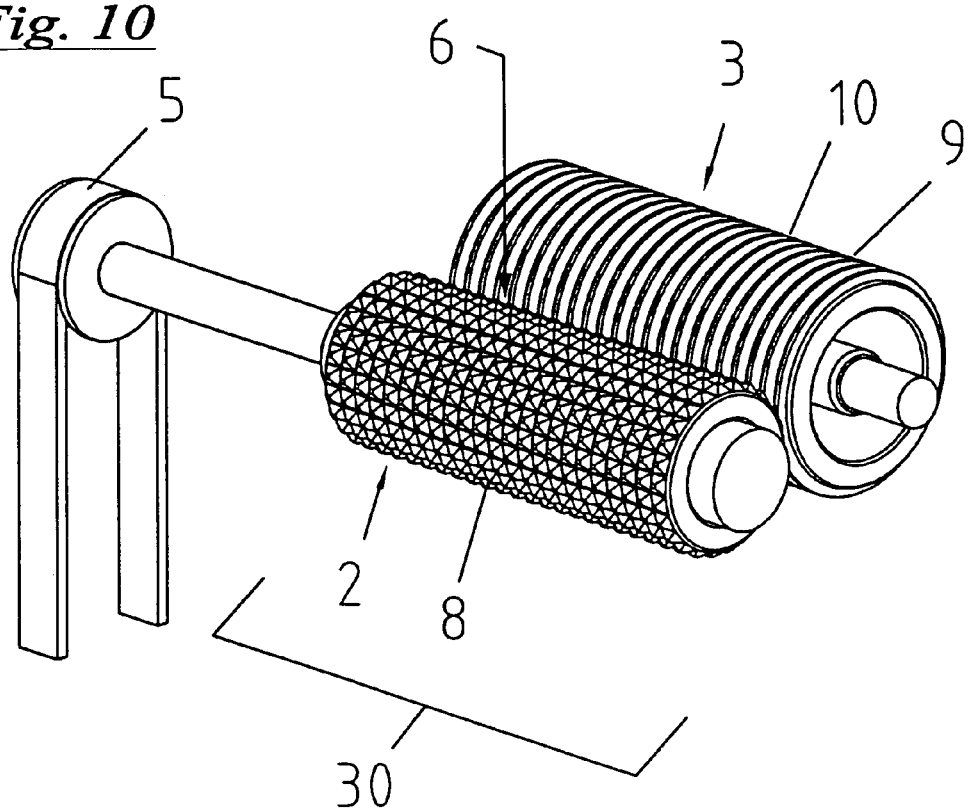
FIG. 10 shows another exemplifying embodiment including two embossing rolls.
Figure 11:
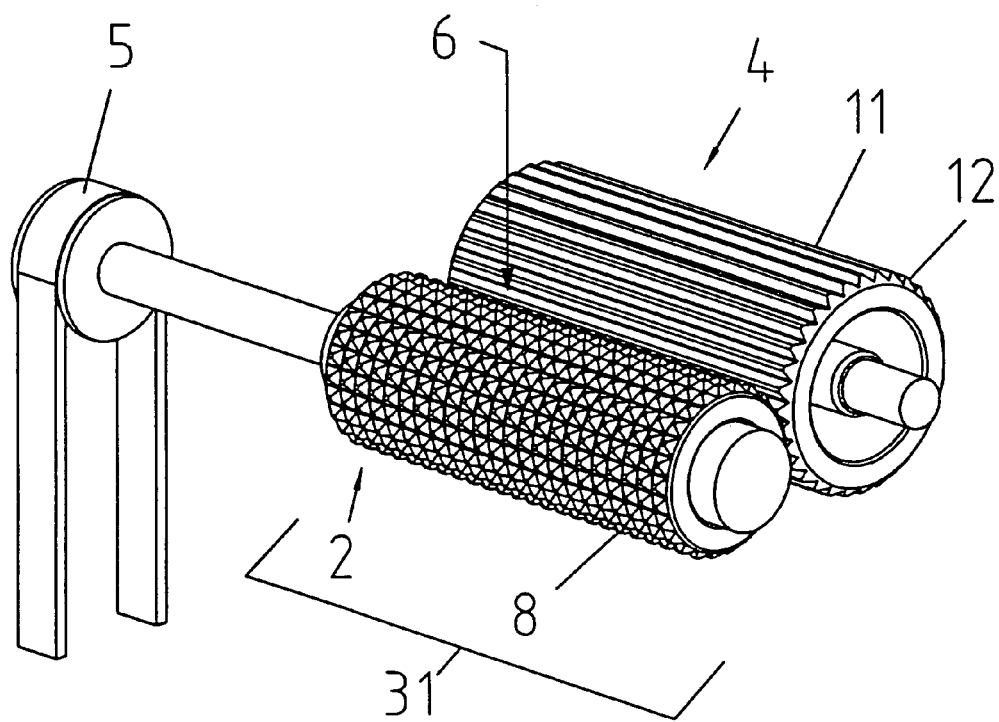
FIG. 11 shows a variant of the embodiment of FIG. 10.

Further tests have shown that most of the above-mentioned advantages can also be obtained in a device comprising two embossing rolls according to FIG. 10 or 11.

Thus, the very schematically illustrated device 30 of FIG. 10 comprises the first embossing roll 2 with teeth 8 and a second embossing roll 3 comprising rings 10 and grooves 9. Furthermore, drive 5 is illustrated, while the yokes are not shown.

A device 31 comprising the first embossing roll 2 with teeth 8 and the second embossing roll 4 with longitudinal ribs 12 and longitudinal grooves 11 is shown in FIG. 11. The remaining elements are the same as in the preceding devices.

What has been said of the three-roll system according to FIGS. 1 to 9 correspondingly applies to the two-roll system of FIGS. 10 and 11, however with the advantage of greater simplicity. If there is a tendency for particularly difficult materials to roll up after the treatment, a smoothing device, e.g. comprising smooth rubber rolls, may be added.

The invention claimed is:

1. A device, wherein the device is adapted to apply a treatment to flat materials, the treatment including simultaneously embossing and satinizing foils, wherein the device comprises at least one first and one second embossing roll between which the flat material is capable of being passed under pressure in order to produce a pattern, the second embossing roll being followed by at least another embossing roll which cooperates with the first or the second embossing roll and between which the patterned flat material is capable of being passed, wherein the first embossing roll is a driven embossing roll including toothing formed of individual teeth, and wherein at least one embossing roll, other than the driven embossing roll, of the embossing rolls comprises a surface structure without individual teeth.

2. A device, wherein the device is adapted to apply a treatment to flat materials, the treatment including simultaneously embossing and satinizing foils, wherein the device comprises at least one first and one second embossing roll between which the flat material is capable of being passed under pressure in order to produce a pattern, wherein the first embossing roll is a driven embossing roll including toothing formed of individual teeth and the second embossing roll comprises a surface structure without individual teeth.

3. Device according to claim 1, wherein at least one of the embossing rolls other than the first embossing roll comprises rings or longitudinal ribs, wherein the cross-section of the rings or longitudinal ribs is outwardly tapered, and wherein the rings or longitudinal ribs are flattened, the dimensions of the rings or longitudinal ribs and of grooves therebetween corresponding to the dimensions of the teeth of the first, driven embossing roll.

4. Device according to claim 2, wherein the second embossing roll comprises rings or longitudinal ribs, in that the cross-section of the rings or longitudinal ribs is outwardly tapered, and wherein the rings or longitudinal ribs are flattened, the dimensions of the rings or longitudinal ribs and of grooves therebetween corresponding to the dimensions of the teeth of the driven embossing roll.

5. Device according to claim 1, wherein the device is adapted to produce signs whose appearance varies according to at least one of (i) the viewing angle of the observer, (ii) a kind of a light source, and (iii) a position of the light source, as a result at least one of a height, a surface, and a geometry of at least one of teeth, rings, or longitudinal ribs of the second embossing roll being different from other teeth, rings or longitudinal ribs of the second embossing roll.

6. Device according to claim 1, wherein at least one of the embossing rolls other than the first, driven embossing roll comprises toothing that is the same as the toothing of the first, driven embossing roll or toothing that is complementary to the toothing of the first, driven embossing roll.

7. Device according to claim 1, wherein at least one of the embossing rolls other than the first, driven embossing roll is a smooth rubber roll.

8. Device according to claim 1, wherein the embossing rolls are positively synchronized with one another by synchronizing means.

9. Device according to claim 6, wherein a non-driven embossing roll is journalled such that it is adapted to move in at least one of the longitudinal direction of an axle and in a contact pressure direction and in a travelling direction of the embossed material.

10. Device according to claim 1, wherein an engraving is provided on the embossing roll provided with teeth.

11. Device according to claim 1 wherein the rolls have equal or unequal diameters and/or lengths, and wherein the embossing rolls are not positively synchronized.

12. Device according to claim 1, wherein the embossing rolls have equal diameters or diameters forming an integral ratio and have equal or unequal lengths, and wherein the embossing rolls are positively synchronized.

13. Device according to claim 1, wherein non-driven rolls are capable of being brought into engagement with the first driven embossing roll individually, in groups, or in common.

14. Device according to claim 1, wherein at least one of the embossing rolls is contained in an exchangeable unit that is insertable in a bearing mount.

15. Device according to claim 14, wherein the embossing rolls are arranged in the exchangeable unit individually, in groups, or in common.

16. A device, wherein the device is adapted to apply a treatment to flat materials, the treatment including simultaneously embossing and satinizing foils to produce a pattern on the foils having an appearance that varies, due to the embossing and satinizing, according to at least one of the viewing angle of the observer, a kind of a light source, a position of the light source, a height of a surface of teeth of the device, and a geometry of the surface of the teeth of the device, wherein the device comprises at least a first embossing roll and a second embossing roll between which the flat material is capable of being passed under pressure in order to produce the pattern, the second embossing roll being followed by at least another embossing roll which cooperates with the first or the second embossing roll and between which the patterned flat material is capable of being passed, wherein the first embossing roll is a driven embossing roll including a toothing formed of individual teeth, wherein at least one embossing roll, other than the driven embossing roll, of the embossing rolls, comprises a surface structure without individual teeth, wherein the at least one embossing roll, other than the driven embossing roll, of the embossing rolls, comprises rings or longitudinal ribs, wherein the cross-section of the rings or longitudinal ribs is outwardly tapered with respect to a longitudinal axis of the respective rolls, wherein the rings or longitudinal ribs are flattened, the dimensions of the rings or longitudinal ribs and of grooves therebetween corresponding to the dimensions of the teeth of the first, driven embossing roll, and wherein at least some rings or longitudinal ribs of the at least one embossing roll, other than the driven embossing roll, of the embossing rolls, are designed to be different from other rings or longitudinal ribs, respectively of the at least one embossing roll, other than the driven embossing roll, of the embossing rolls.

17. A device, wherein the device is adapted to apply a treatment to flat materials, the treatment including simultaneously embossing and satinizing foils to produce a pattern on the foils having an appearance that varies, due to the embossing and satinizing, according to at least one of the viewing angle of the observer, a kind of a light source, a position of the light source, a height of a surface of teeth of the device, and a geometry of the surface of the teeth of the device, comprising at least one first and one second embossing roll between which the flat material is capable of being passed under pressure in order to produce a pattern, wherein the first embossing roll is a driven embossing roll including toothing formed of individual teeth and the second embossing roll comprises a surface structure without individual teeth, wherein the second embossing roll comprises rings or longitudinal ribs, wherein the cross-section of the rings or longitudinal ribs is outwardly tapered with respect to a longitudinal axis of the second embossing roll, and wherein the rings or longitudinal ribs are flattened, the dimensions of the rings or longitudinal ribs and of grooves therebetween corresponding to the dimensions of the teeth of the driven embossing roll, and wherein at least some rings or longitudinal ribs of the second embossing roll are designed to be different from other rings or longitudinal ribs, respectively, of the second embossing roll.

* * * * *